(12) United States Patent
Achkir

(10) Patent No.: US 9,304,256 B2
(45) Date of Patent: Apr. 5, 2016

(54) UNIVERSAL WAVEGUIDE INDEX TRANSLATOR

(71) Applicant: Cisco Technology, Inc., San Jose, CA (US)

(72) Inventor: D. Brice Achkir, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 144 days.

(21) Appl. No.: 14/153,256

(22) Filed: Jan. 13, 2014

(65) Prior Publication Data

US 2015/0198767 A1    Jul. 16, 2015

(51) Int. Cl.
*G02B 6/12*    (2006.01)
*G02B 6/26*    (2006.01)
*G02B 6/30*    (2006.01)

(52) U.S. Cl.
CPC ............ *G02B 6/262* (2013.01); *G02B 6/305* (2013.01); *G02B 6/30* (2013.01)

(58) Field of Classification Search
CPC ............ G02B 6/30; G02B 6/305; G02B 6/262
USPC ................. 385/14–15, 31, 33–36, 53, 88–94, 385/129–132
See application file for complete search history.

(56) References Cited

U.S. PATENT DOCUMENTS

| | | | | |
|---|---|---|---|---|
| 4,735,677 A | * | 4/1988 | Kawachi et al. | 438/25 |
| 5,854,868 A | * | 12/1998 | Yoshimura et al. | 385/14 |
| 6,081,638 A | * | 6/2000 | Zhou | 385/31 |
| 6,792,178 B1 | * | 9/2004 | Zhou | 385/31 |
| 2003/0165292 A1 | * | 9/2003 | Bhagavatula et al. | 385/33 |
| 2004/0131320 A1 | * | 7/2004 | Inui et al. | 385/123 |
| 2005/0069257 A1 | * | 3/2005 | Bhagavatula et al. | 385/33 |
| 2005/0150255 A1 | * | 7/2005 | Tang | 65/387 |
| 2013/0183015 A1 | * | 7/2013 | Mori et al. | 385/126 |

* cited by examiner

*Primary Examiner* — Ryan Lepisto
*Assistant Examiner* — Guy Anderson
(74) *Attorney, Agent, or Firm* — Merchant & Gould P.C.

(57) ABSTRACT

An apparatus may be provided. The apparatus may comprise a first edge having a first area and a second edge having a second area larger than the first area. The apparatus may further comprise a volume of material disposed between the first edge and the second edge. The volume of material may have a first numeral aperture value at the first area and a second numeral aperture value at the second area. The second numeral aperture value may be less than the first numeral aperture value.

20 Claims, 6 Drawing Sheets

UNIVERSAL WAVEGUIDE INDEX TRANSLATOR

TECHNICAL FIELD

The present disclosure relates generally to optical waveguides.

BACKGROUND

An optical waveguide is a physical structure that guides electromagnetic waves in the optical spectrum. Common types of optical waveguides include optical fiber and rectangular waveguides. Optical waveguides are used as components in integrated optical circuits or as the transmission medium in local and long haul optical communication systems. Optical waveguides can be classified according to their geometry (e.g., planar, strip, or fiber waveguides), mode structure (e.g., single-mode, multi-mode), refractive index distribution (e.g., step or gradient index), and material (e.g., glass, polymer, or semiconductor).

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
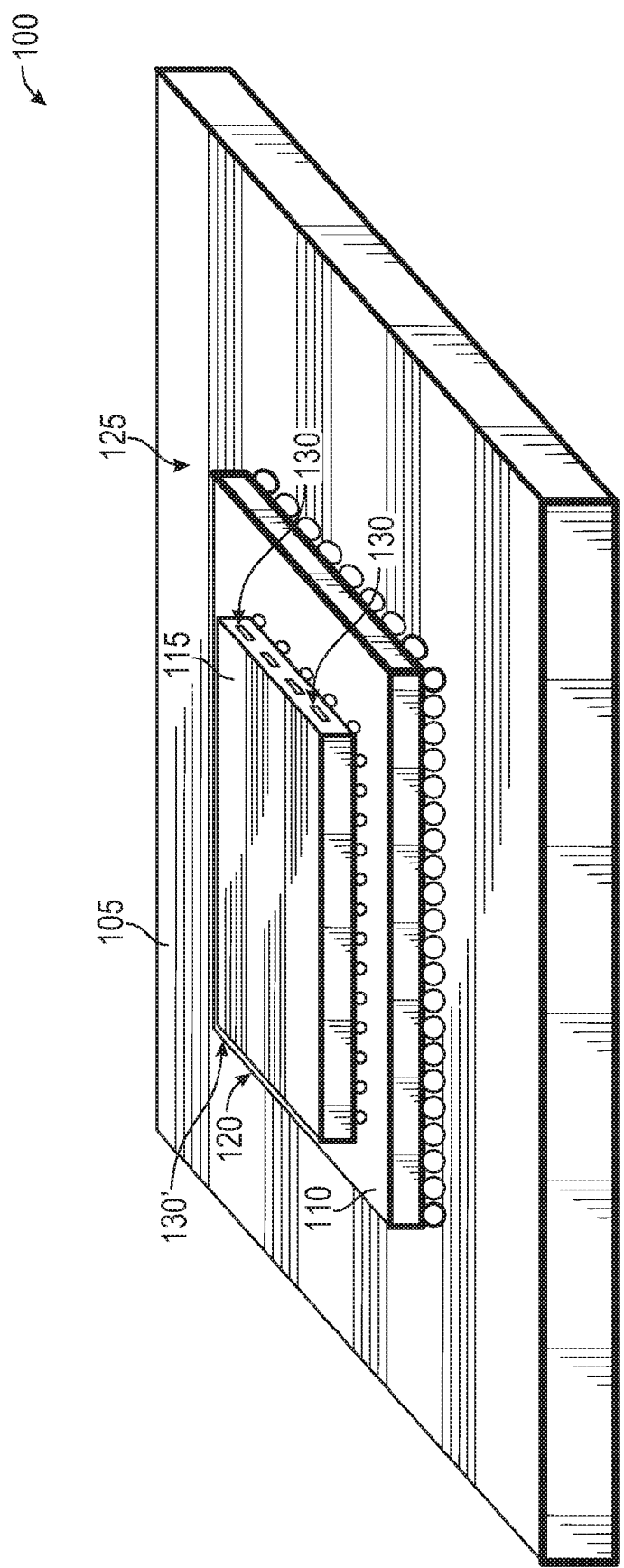
FIG. 1 shows a photonic chip.

An apparatus may be provided. The apparatus may comprise a first edge having a first area and a second edge having a second area larger than the first area. The apparatus may further comprise a volume of material disposed between the first edge and the second edge. The volume of material may have a first numeral aperture value at the first area and a second numeral aperture value at the second area. The second numeral aperture value may be less than the first numeral aperture value.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Demand for more consumption of bandwidth related to applications such as high performance computing (HPC) and video, for example, may be driving a need for more speed and bandwidth for next generation devices. The architecture and design of next generation devices may solve many copper and electrical limitations to allow going beyond, for example, 50 Gb/s per channel. One technology that may be utilized to increase speed and bandwidth in next generation devices is silicon photonics.

Silicon photonics is the application of photonic systems that use silicon as an optical medium. The silicon may be patterned with sub-micrometer precision, into microphotonic components. These components may operate in the infrared light spectrum, for example, at the 1.55 micrometer wavelength used by most fiber optic telecommunication systems. The silicon may lie on top of a layer of silica in what is known as silicon on insulator (SOI).

Silicon photonic devices may be made using existing semiconductor fabrication techniques, and because silicon may already be used as a substrate for most integrated circuits, it is possible to create hybrid devices in which the optical and electronic components are integrated onto a single microchip.

One problem to overcome may be the mismatch between an optical silicon waveguide on a silicon photonic device and a single mode optical fiber that may carry light in and out of the silicon photonic device. For example, the optical silicon waveguide may have an interface of about 300 nm by 200 nm with a numeral aperture of about 0.5, while the single mode optical fiber may have a circular core of 9 microns with a numeral aperture of about 0.12. Given this mismatch, coupling the optical silicon waveguide and the single mode optical fiber may lead to light being reflected back to the optical silicon wave guide causing a large attenuation of the transmitted signal from the optical silicon waveguide. Accordingly, there may be a need to translate light from the optical silicon wave guide to the optical fiber and vice versa with minimum coupling losses.

FIG. 1 shows a photonic chip 100 mounted on a circuit board 105. As shown in FIG. 1, photonic chip 100 may comprise a substrate 110 and a photonic die 115. Photonic die 115 may have a light-in side 120 and a light-out side 125. Photonic die 115 may comprise a plurality of die waveguides 130 on light-out side 125 and a plurality of die waveguides 130' on light-in side 120. While photonic chip 100 of FIG. 1 utilizes the transmission and reception of light through an edge, embodiments of the disclosure may also include the transmission and reception of light through any surface of photonic chip 100. Plurality of die waveguides 130 and plurality of die waveguides 130' may comprise, for example, optical silicon waveguides.

Consistent with embodiments of the disclosure, light signals may enter photonic chip 100 from plurality of die waveguides 130' on light-in side 120 of photonic die 115. The light signals may be converted to electrical signals by photonic die 115 and distributed to substrate 110. Substrate 110 may then fan out the converted electrical signals to other elements connected to circuit board 105. The other elements connected to circuit board 105 may process the electrical signals and send the processed electrical signals back to photonic die 115 through substrate 110. Photonic die 115 may then convert the processed electrical signals back into light signals. These light signals may then be transmitted out of photonic die 115 through plurality of die waveguides 130 on light-out side 125.

Figure 2:
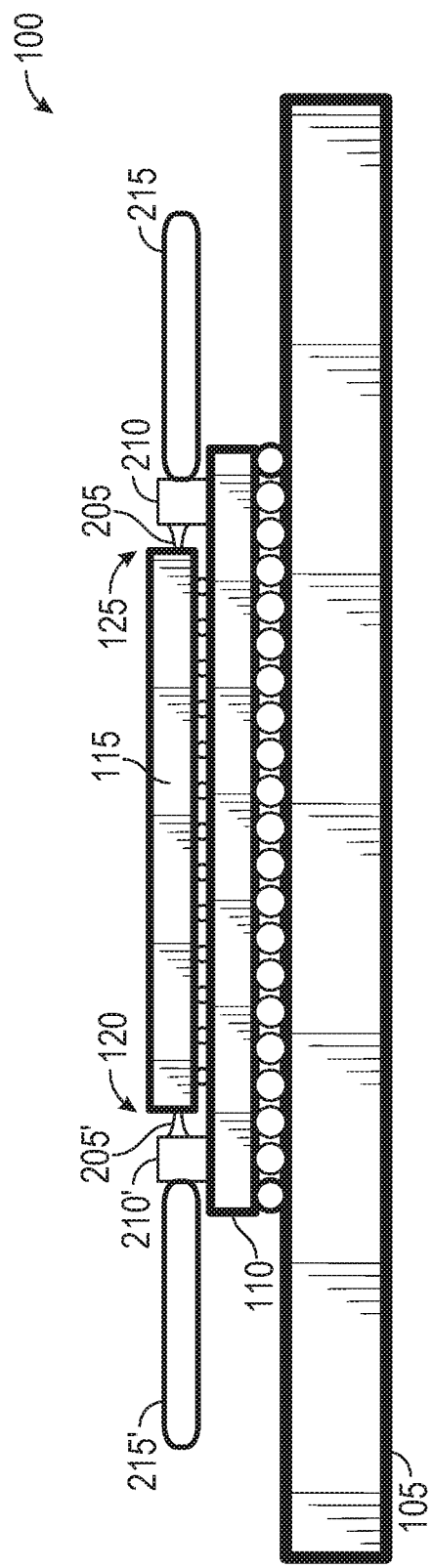
FIG. 2 shows a photonic chip.

FIG. 2 shows photonic chip 100 in more detail. In order to transmit light signals out of photonic die 115, a plurality of translator waveguides 205 may be respectively coupled adjacent to plurality of die waveguides 130. Through a plurality of optical connectors 210, plurality of translator waveguides 205 may be respectively coupled to a plurality of fibers 215. Accordingly, light signals on each of plurality of die waveguides 130 may be transmitted out of photonic die 115 and respectively into plurality of fibers 215. Similarly, in order to transmit light signals into photonic die 115, a plurality of translator waveguides 205' may be respectively coupled adjacent to plurality of die waveguides 130'. Through a plurality of optical connectors 210', plurality of translator waveguides 205' may be respectively coupled to a plurality of fibers 215'. Accordingly, light signals may be transmitted into plurality of die waveguides 130' of photonic die 115 respectively from plurality of fibers 215'.

Figure 3:
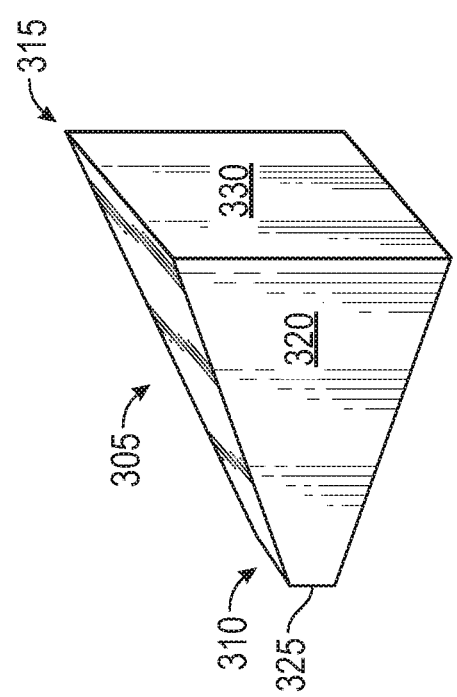
FIG. 3 shows a translator waveguide.

FIG. 3 shows a translator waveguide 305. Any one or more of plurality of translator waveguides 205 may comprise translator waveguide 305. Similarly, any one or more of plurality of translator waveguides 205' may comprise translator waveguide 305. As shown in FIG. 3, translator waveguide 305 may comprise a first edge 310, a second edge 315, and a volume of material 320 disposed between first edge 310 and second edge 315. First edge 310 may comprise a first area 325 and second edge 315 may comprise a second area 330.

Translator waveguide 305 may be wedge shaped with second area 330 being larger than first area 325. While first area 325 may be substantially square and may be approximately 3 microns by 3 microns, first area 325 may comprise any geometry and any size. Furthermore, while second area 330 may be substantially square and may be approximately 9 microns by 9 microns, second area 330 may comprise any geometry and any size. Translator waveguide 305 may comprise a length of approximately 1 cm between first edge 310 and second edge 315; however, translator waveguide 305 is not so limited and may comprise any length.

Figure 4:
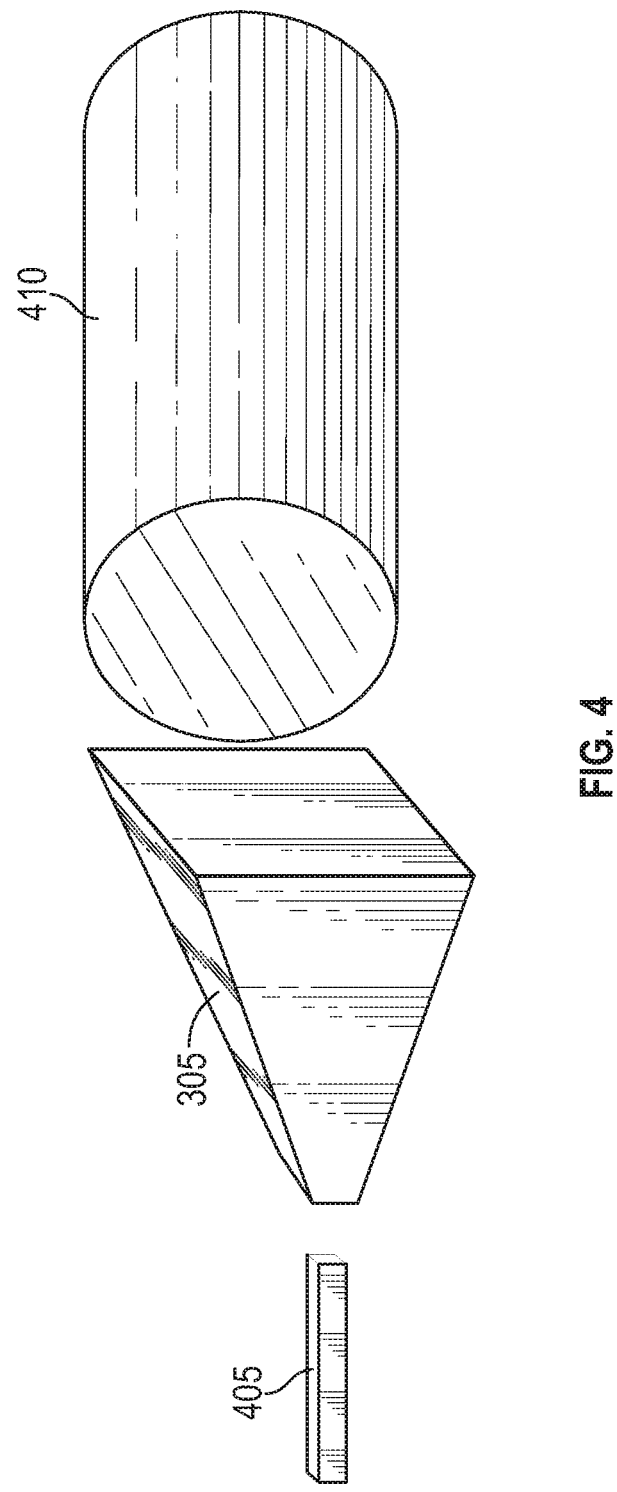
FIG. 4 shows a die waveguide, a translator waveguide, and a fiber.

FIG. 4 shows a die waveguide 405, translator waveguide 305, and a fiber 410. Any one or more of plurality of die waveguides 130 may comprise die waveguide 405. Similarly, any one or more of plurality of die waveguides 130' may comprise die waveguide 405. Die waveguide 405 may comprise, for example, a silicon waveguide constructed during the fabrication of photonic die 115, for example.

Moreover, any one or more of plurality of fibers 215 may comprise fiber 410. And any one or more of plurality of fibers 215' may comprise fiber 410. While die waveguide 405 may be substantially rectangular and may be approximately 300 nm by 200 nm, die waveguide 405 may comprise any geometry and any size. Furthermore, while fiber 410 may be substantially rounded and may be approximately 9 microns in diameter, fiber 410 may comprise any geometry and any size.

Translator waveguide 305 may be disposed between die waveguide 405 and fiber 410. Translator waveguide 305's first area 325 of first edge 310 may be adjacent die waveguide 405. Translator waveguide 305's second area 330 of second edge 315 may be adjacent fiber 410. Consistent with embodiments of the disclosure, second area 330 may be larger than first area 325. Consequently, light from fiber 410 may be transmitted into die waveguide 405 through translator waveguide 305. Similarly, light from die waveguide 405 may be transmitted into fiber 410 through translator waveguide 305.

In optics, the numerical aperture of an optical system is a dimensionless number that characterizes the range of angles over which the system can accept or emit light. By incorporating index of refraction in its definition, numerical aperture has the property that it is constant for a beam as it goes from one material to another provided there is no optical power at the interface. A mismatch in properties such as numerical aperture may exist between die waveguide 405 and fiber 410. Consistent with embodiments of the disclosure, translator waveguide 305 may solve this mismatch in properties between die waveguide 405 and fiber 410.

As stated above, volume of material 320 may be disposed between first edge 310 and second edge 315. Volume of material 320 may have a first numeral aperture value at first area 325 and a second numeral aperture value at second area 330. The second numeral aperture value may be less than the first numeral aperture value. Consistent with embodiments of the disclosure, the first numeral aperture value may be compatible with a numeral aperture value of die waveguide 405 and the second numeral aperture value may be compatible with a numeral aperture value of fiber 410. For example, the first numeral aperture value may be approximately 0.5 and the second numeral aperture value may be approximately 0.12. The aforementioned values are examples and the first numeral aperture value and the second numeral aperture value may comprise any value.

The first numeral aperture value may be based on the size of first area 325 and the type of material that volume of material 320 is made of. The second numeral aperture value may be based on the size of second area 330, the type of material that volume of material 320 is made of, and a length of translator waveguide 305 between first edge 310 and second edge 315. For example, the volume of the material may comprise a polymer. The polymer used may comprise an aromatic monomer and an aliphatic monomer. A ratio of the aromatic monomer to the aliphatic monomer in the volume of the material may establish the first numeral aperture value along with the size of the first area. Then, the desired second numeral aperture value may be based on the size of second area 330 and the length of translator waveguide 305 between first edge 310 and second edge 315.

As shown in FIG. 4, die waveguide 405 (e.g. plurality of die waveguides 130 and plurality of die waveguides 130') may comprise silicon nano structures, for example, of about 300 um×200 um with a large numeral aperture value of about 0.5, for example. To be able to use die waveguide 405, it may need to be connected to a signal mode fiber (e.g. fiber 410) that may have a numeral aperture value of about 0.12. To solve this mismatch in numeral aperture between the two media (e.g. between die waveguide 405 and fiber 410) embodiments of the disclosure may use translator waveguide 305 that may comprise, for example, a polymer waveguide. While a polymer may be used to construct translator waveguide 305, other materials may be used and embodiments of the disclosure are not limited to a polymer material.

Embodiments of the disclosure may start with a material formulation, for example, of a polymer material for volume of material 320. This polymer material may have two key monomers: i) aromatic and ii) aliphatic. The ratio of the aromatic to the aliphatic monomer may be adjusted to increase or decrease the guide index for volume of material 320 giving the flexibility to fabricate translator waveguide 305 with any numeral aperture value.

Once a desired numeral aperture value is established, the aforementioned monomer ratio may be determined. For example, it may be desired to give first area 325 a numeral aperture value of 0.5 and a geometry of 3 um by 3 um. This numeral aperture value and geometry may be chosen in order for first edge 310 of translator waveguide 305 to be compatible with die waveguide 405. In other words, first edge 310 may be given a numeral aperture value that may substantial match die waveguide 405's numeral aperture value. And first edge 310 may be given a geometry that may allow die waveguide 405 and translator waveguide 305 to adjacently mate. Consequently, the aforementioned monomer ratio may be determined to provide the desired numeral aperture value at first edge 310 given the desired size and geometry of first area 325.

As the width and height of translator waveguide 305 is increased in the direction of second edge 315, the numeral aperture value of translator waveguide 305 may decrease as a result of the length and tapering towards second edge 315. Consequently, a length of translator waveguide 305 may be established that will provide a desired numeral aperture value at second edge 315 that will be compatible with fiber 410 given: i) the desired size and geometry of second area 330 to match fiber 410; and ii) the monomer ratio to provide the desired numeral aperture value at first edge 310 given the desired size and geometry of first area 325. For example, the monomer ratio may be selected to provide a numeral aperture value of approximately 0.5 when first area 325 at first edge 310 is approximately 3 microns by 3 microns to be compatible with die waveguide 405. Then translator waveguide 305 may be given a length of approximately 1 cm to provide a numeral aperture value of approximately 0.12 at second edge 315 when second area 330 is approximately 9 microns by 9 microns to be compatible with fiber 410.

Figure 5:
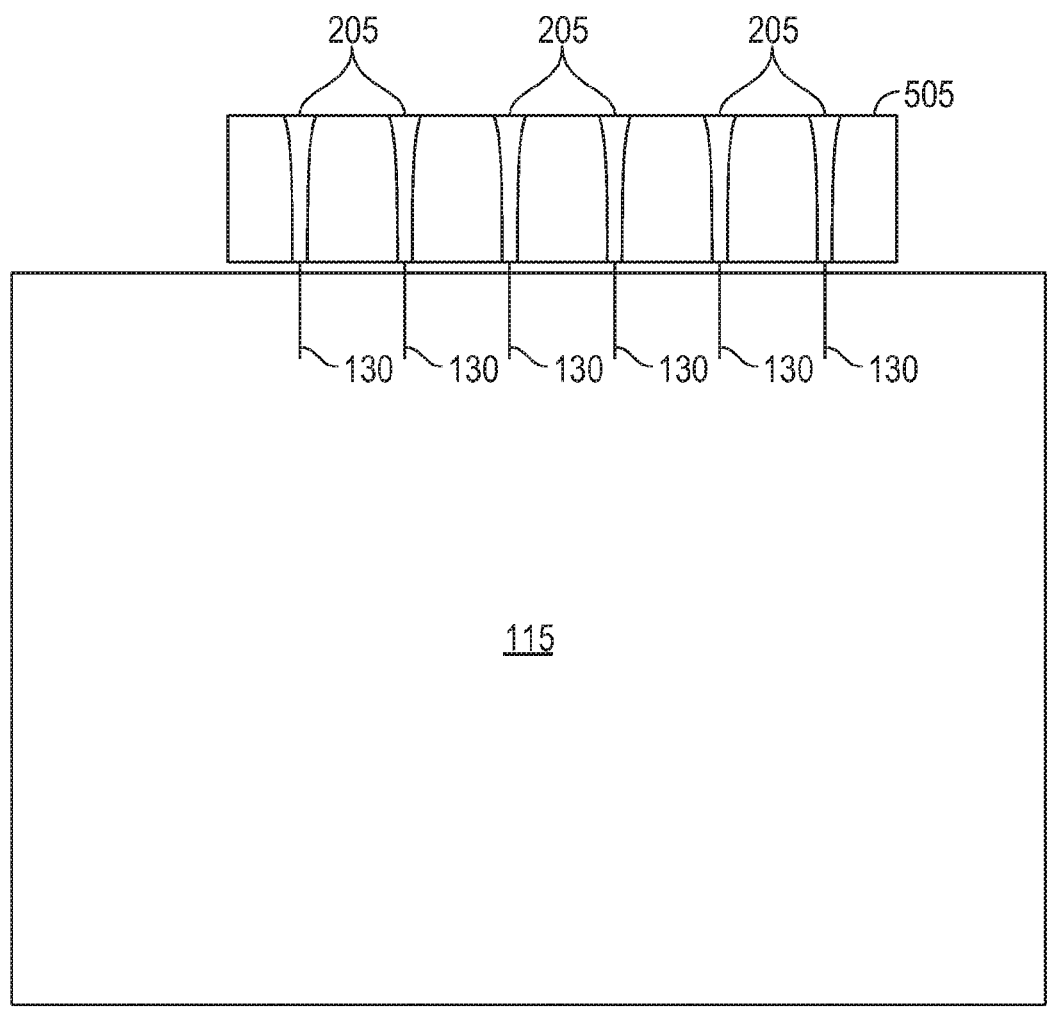
FIG. 5 shows a ribbon adjacent a photonic die.

FIG. 5 shows a ribbon 505 adjacent photonic die 115. As shown in FIG. 5, ribbon 505 may contain plurality of translator waveguides 205 in a ridged manner. Ribbon 505 may also provide cladding to each of plurality of translator waveguides 205 in order to help contain light in each of plurality of translator waveguides 205. Moreover, a spacing between each of the translator waveguides in plurality of translator waveguides 205 may be congruent with a spacing between each of the die waveguides in plurality of die waveguides 130. Consequently, when one of the translator waveguides in plurality of translator waveguides 205 is lined up with one of the die waveguides in plurality of die waveguides 130, others of the translator waveguides in plurality of translator waveguides 205 is lined up with others of the die waveguides in plurality of die waveguides 130 when the aforementioned spacing is congruent.

Consistent with embodiments of the disclosure, when an edge of photonic die 115 is in line with an edge of ribbon 505, a one of the plurality of translator waveguides 205 may be in line with a respective one of plurality of die waveguides 130. Similarly, when a mark on photonic die 115 is in line with a corresponding mark on ribbon 505, a one of the plurality of translator waveguides 205 may be in line with a respective one of plurality of die waveguides 130. Consequently, alignment of plurality of die waveguides 130 and plurality of translator waveguides 205 may be accomplished.

Figure 6:
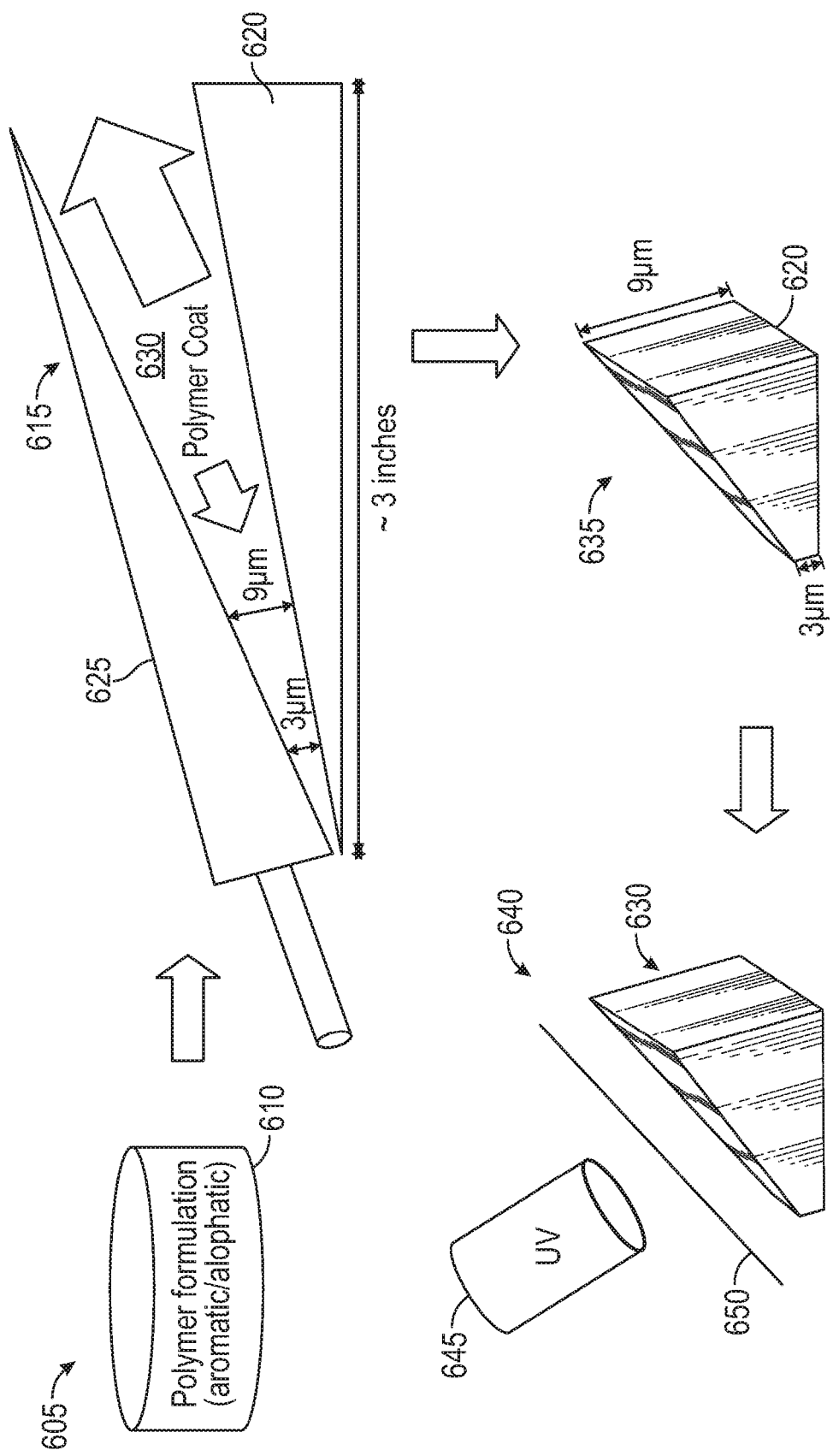
FIG. 6 is a diagram illustrating a process for providing a translator waveguide.

FIG. 6 is a diagram illustrating a process for providing translator waveguide 305. To fabricate the wedge shape of translator waveguide 305, the width and height may be changed in Y and Z direction (X is the length direction). For example, to provide a 3 um×3 um entrance (e.g. first area 325) and 9 um×9 um exit (second area 330) with approximately a 1 cm length (e.g. this length may be enough to reduce the propagating in the film plan), in the photo mask, we may start with a waveguide film with a 3 um and finishing with 9 micron (in Y direction). To change the out of plane taper to modify the waveguide film thickness over the 1 cm, we may alternate a coating process to achieve a graded thickness coating. The states of FIG. 6 illustrate this process.

As shown in FIG. 6, state 605 may start with forming a mixture 610 with a ration between an aromatic monomer and an aliphatic monomer being determined to give a desired numeral aperture value. The desired numeral aperture value may comprise the first numeral aperture value being compatible with a numeral aperture value of die waveguide 405. This value may comprise, but is not limited to 0.5. The monomers may then be mixed to form mixture 610 according to the aforementioned ration.

Next, at state 615, using an angled substrate 620 and a doctor knife 625 with similar angle, mixture 610 may be coated forming a taper 630 between substrate 620 and doctor knife 625. Because doctor knife 625 and substrate 620 may be long (e.g. about 3 inches) this may lead to a long taper 630, however, we may only be interested in, for example, a 1 cm length with 3 micron and 9 micron sections. Adequate calculation of the angles of both doctor knife 625 and substrate 620 may be utilized. After coating at state 615, taper 630 may be cut at state 635 followed by exposing taper 630 to polymerization at state 640 to fix the polymer structure taper 630 using ultraviolet light 645 and a mask 650. After polymerization in state 640, taper 630 may be used as a translator waveguide (e.g. translator waveguide 305.) All dimensions shown in FIG. 6 are examples and any dimensions may be used.

An embodiment consistent with the disclosure may comprise an apparatus. The apparatus may comprise a first edge having a first area and a second edge having a second area larger than the first area. The apparatus may further comprise a volume of material disposed between the first edge and the second edge. The volume of material may have a first numeral aperture value at the first area and a second numeral aperture value at the second area. The second numeral aperture value may be less than the first numeral aperture value.

Another embodiment consistent with the disclosure may comprise a system. The system may comprise a die waveguide, a fiber, and a translator waveguide disposed between the die waveguide and the fiber. The translator waveguide may comprise a first edge having a first area adjacent the die waveguide and a second edge having a second area adjacent the fiber. The second area may be larger than the first area. The translator waveguide may further comprise a volume of material disposed between the first edge and the second edge. The volume of material may have a first numeral aperture value at the first area and a second numeral aperture value at the second area. The second numeral aperture value may be less than the first numeral aperture value. The first numeral aperture value may be compatible with a numeral aperture value of the die waveguide. The second numeral aperture value may be compatible with a numeral aperture value of the fiber.

Yet another embodiment consistent with the disclosure may comprise a system. The system may comprise a plurality of die waveguides disposed along an edge of a photonic die. The system may further comprise a plurality of translator waveguides disposed in a ribbon. Each of the plurality of translator waveguides may comprise a first edge having a first area adjacent respective ones of the plurality of die waveguides. The plurality of translator waveguides may be disposed in the ribbon wherein, when a one of the plurality of translator waveguides is in line with a respective one of the plurality of die waveguides, others of the plurality of translator waveguides are in line with respective others of the plurality of die waveguides.

Embodiments of the present disclosure, for example, are described above with reference to diagrams and/or operational illustrations of methods, apparatuses, and systems according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising: a first edge having a first area, the first area being substantially planar; a second edge having a second area larger than the first area, the second area being substantially planar and substantially parallel to with the first area; and a volume of material disposed between the first edge and the second edge, the volume of material having a first numeral aperture value at the first area and a second numeral aperture value at the second area, the second numeral aperture value being less than the first numeral aperture value, wherein a size of the first area and a ratio of a first monomer to a second monomer in the volume of the material establishes the first numeral aperture value and a size of the second area and a length between the first edge and the second edge establishes the second numeral aperture value.

2. The apparatus of claim 1, wherein the first numeral aperture value is based on the first area and the volume of material.

3. The apparatus of claim 1, wherein the second numeral aperture value is based on the second area, the volume of material, and a length between the first edge and the second edge.

4. The apparatus of claim 1, wherein the volume of the material is wedge shaped.

5. The apparatus of claim 1, wherein the volume of the material comprises a polymer.

6. The apparatus of claim 1, wherein the volume of the material comprises a polymer comprising an aromatic monomer and an aliphatic monomer.

7. The apparatus of claim 1, wherein the volume of the material comprises a polymer comprising an aromatic monomer and an aliphatic monomer wherein a ratio of the aromatic monomer to the aliphatic monomer in the volume of the material establishes the first numeral aperture value.

8. The apparatus of claim 1, wherein the first numeral aperture value is approximately 0.5.

9. The apparatus of claim 1, wherein the second numeral aperture value is approximately 0.12.

10. The apparatus of claim 1, wherein the volume of the material comprises a length of about 1 cm between the first edge and the second edge.

11. The apparatus of claim 1, wherein the first area is approximately 3 microns by 3 microns.

12. The apparatus of claim 1, wherein the second area is approximately 9 microns by 9 microns.

13. A system comprising: a die waveguide; a fiber; and a translator waveguide disposed between the die waveguide and the fiber, the translator waveguide comprising: a first edge having a first area adjacent the die waveguide, the first area being substantially planar, a second edge having a second area adjacent the fiber, the second area being larger than the first area, the second area being substantially planar and substantially parallel with the first area, and a volume of material disposed between the first edge and the second edge, the volume of material having a first numeral aperture value at the first area and a second numeral aperture value at the second area, the second numeral aperture value being less than the first numeral aperture value, the first numeral aperture value being compatible with a numeral aperture value of the die waveguide and the second numeral aperture value being compatible with a numeral aperture value of the fiber, wherein a size of the first area and a ratio of a first monomer to a second monomer in the volume of the material establishes the first numeral aperture value and a size of the second area and a length between the first edge and the second edged establishes the second numeral aperture value.

14. The system of claim 13, wherein the die waveguide is disposed in a photonic die.

15. The system of claim 13, wherein the first monomer comprises an aromatic monomer and the second monomer comprises an aliphatic monomer.

16. The system of claim 13, wherein the first edge and the die waveguide have congruent rectangular shapes.

17. The system of claim 13, wherein the second edge comprises a substantially square shape and the fiber comprises a substantially circular shape with a diameter substantially equal to the length of a side of the substantially square shape.

18. A system comprising: a plurality of die waveguides disposed along an edge of a photonic die; and a plurality of translator waveguides disposed in a ribbon, wherein each of the plurality of translator waveguides comprise; a volume of material, a first edge having a first area adjacent a respective one of the plurality of die waveguides, the first area being substantially planar, the volume of material having a first numerical aperture value at the first area, and a second edge having a second area larger than the first area, the second area being substantially planar and substantially parallel with the first area, the volume of material having a second numerical aperture value at the second area, wherein a size of the first area and a ratio of a first monomer to a second monomer in the volume of the material establishes the first numerical aperture value, and a size of the second area and a length between the first edge and the second edge establishes the second numerical aperture value, when a one of the plurality of translator waveguides is in line with a respective one of the plurality of die waveguides, others of the plurality of translator waveguides are in line with respective others of the plurality of die waveguides.

19. The system of claim 18, wherein the one of the plurality of translator waveguides is in line with the respective one of the plurality of die waveguides when an edge of the photonic die is in line with an edge of the ribbon.

20. The system of claim 18, wherein the one of the plurality of translator waveguides is in line with the respective one of the plurality of die waveguides when a mark on the photonic die is in line with a mark on the ribbon.

* * * * *